Figure 1:
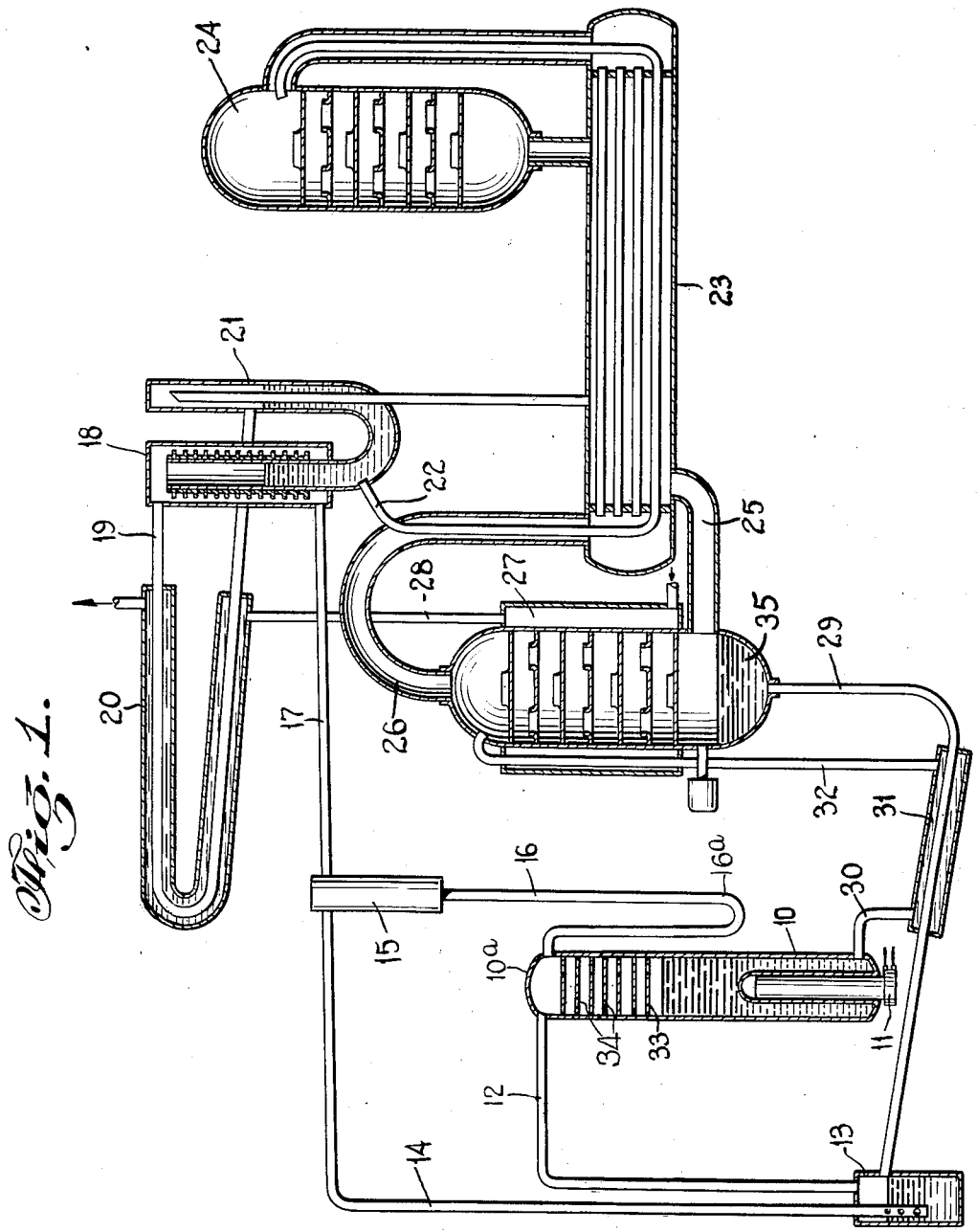

March 7, 1933.　　　D. B. KNIGHT　　　1,900,650
ABSORPTION REFRIGERATING APPARATUS
Filed March 2, 1931　　　2 Sheets-Sheet 1

INVENTOR.
D. B. Knight
BY
A. Yates Dowell
ATTORNEY

March 7, 1933.  D. B. KNIGHT  1,900,650
ABSORPTION REFRIGERATING APPARATUS
Filed March 2, 1931  2 Sheets-Sheet 2
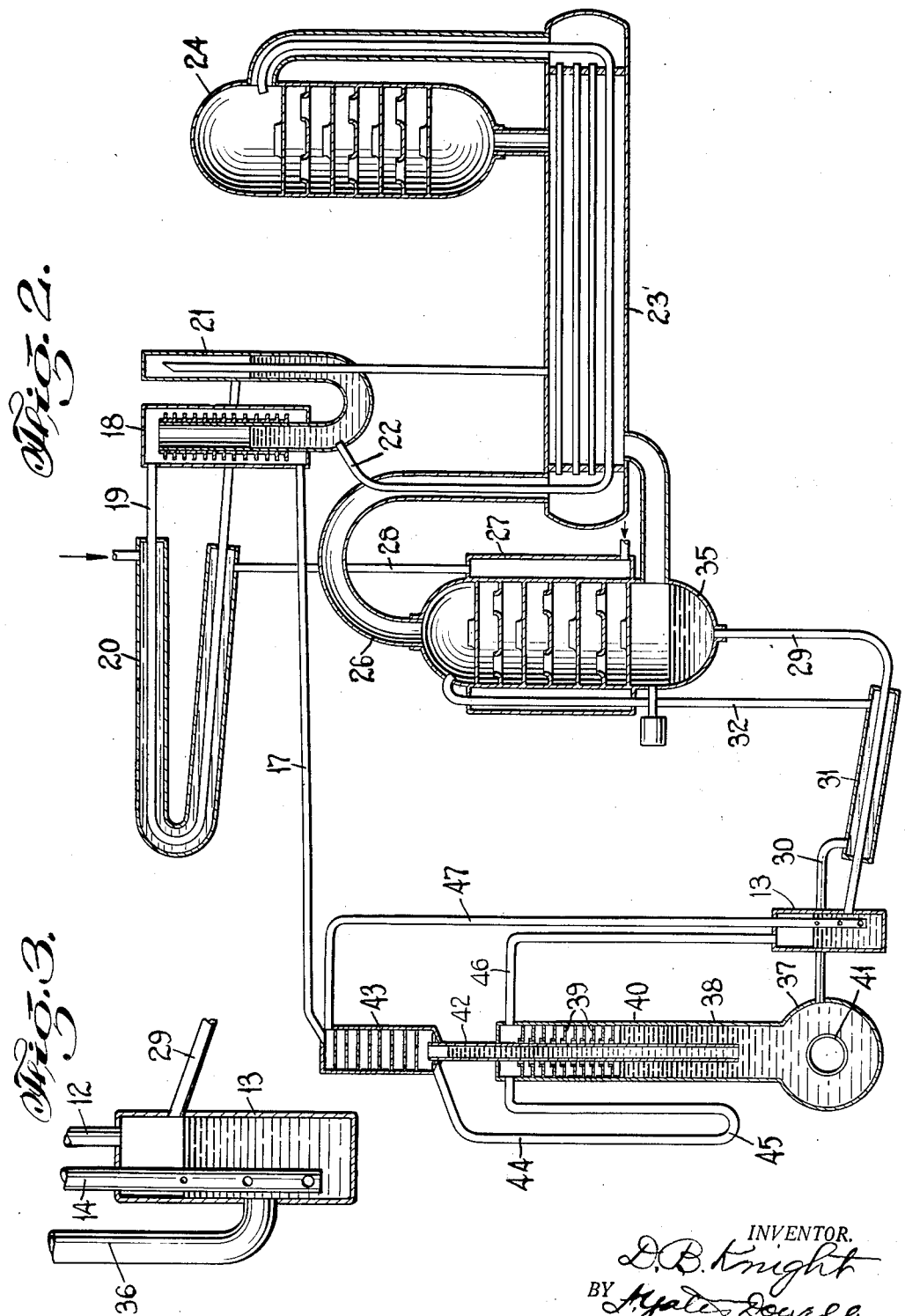
INVENTOR.
D. B. Knight
BY
ATTORNEY Patented Mar. 7, 1933

1,900,650

UNITED STATES PATENT OFFICE

DONALD BRANCH KNIGHT, OF BROOKLYN, NEW YORK, ASSIGNOR TO ELECTROLUX SERVEL CORPORATION, OF NEW YORK, N. Y., A CORPORATION OF DELAWARE

ABSORPTION REFRIGERATING APPARATUS

Application filed March 2, 1931. Serial No. 519,316.

This invention relates to refrigerating apparatus of the absorption type and more particularly to the circulation of absorption liquid in absorption type apparatus wherein a pressure equalizing medium, preferably an inert gas, circulates between the evaporator and absorber.

The invention contemplates pumping absorption liquid from one level to another in a pressure equalized system by means of a vapor liquid pump supplied with vapor from the boiler.

It is an object of the invention to provide an arrangement whereby only a portion of the vapor expelled from solution in the boiler is used for pumping in order to obtain the proper proportion of vapor to liquid for circulation compatible with given refrigerating requirements.

It is an important object of the invention to increase the efficiency of the system by reducing rectification losses by interposing between the rectifier and the boiler an analyzer through which the vapor passes in contact with and counterflow to the enriched absorption liquid from the absorber.

Further objects and advantages will be apparent from the following description taken in connection with the accompanying drawings wherein—

Fig. 1 is a diagrammatic view illustrating one application of the invention whereby all of the vapor generated in the boiler is used for pumping;

Fig. 2, a diagrammatic view of an arrangement whereby only a portion of the vapor generated in the boiler is used for pumping; and Fig. 3, a detail view of the pump chamber shown in Fig. 1 provided with a vapor bypass so that under heavy loads only a portion of the vapor is used for pumping.

Referring to Fig. 1 of the drawings, the generator comprises a boiler 10 containing a solution of refrigerant in an absorption liquid adapted to be heated by some means such as an electric heating element 11 and communicating at its upper portion with an analyzing chamber 10a which may be a separate chamber but is preferably constructed as part of the generator as shown. The upper portion of the analyzer is connected by a pipe 12 with a pump chamber 13 which is provided with a thermosiphon or pump pipe 14 discharging into a separating chamber 15. The lower part of the separating chamber 15 is connected to the upper end of the analyzer through a pipe 16 in which there is a U-bend trap 16a. The upper part of the separating chamber 15 is connected to the rectifier 18 through a pipe 17. A condenser 20, gas heat exchanger 23, evaporator 24 and absorber 35 comprise the other parts of this apparatus and are connected as usual in the well known pressure equalized type of absorption refrigerating system.

In the operation of the system boiler 10 is heated and refrigerant vapor expelled from solution passes upwardly to the analyzer 10a in a circuitous or baffled path through the staggered openings 34 in the plates 33.

From the analyzer the vapor passes through conduit 12 to the pump chamber 13 supplied with enriched absorption liquid from the absorber 25 through conduit 29 in heat exchange relation with the weak absorption liquid in heat exchanger 31 to the pump chamber 13. The enriched absorption liquid is lifted by the vapor through the pump pipe 14 in a well known manner and discharged into the separating chamber 15 where the liquid is separated and passes down through the pipe 16 and trap 16a into the upper end of the analyzer 10a. If the height of the liquid column above the connection of trap 16a to the analyzer is greater than the height of the liquid column in the absorber above the pump hole in chamber 13, the separated liquid will flow into the analyzer and descend through the openings 34 in the baffle plates 33 in counterflow to the rising refrigerant vapor and will be returned to the boiler. The liquid level in the boiler is at a distance below the opening of pipe 32 into the absorber equal to the height of liquid in the absorber above the pump hole in pump chamber 13.

The pumping vapor from the pipe 14 passes from the separating chamber through pipe 17 to the rectifier 18 where removal of the absorption liquid vapor is obtained by condensation and the condensate returns by gravity through the inclined pipe 17 to the separating chamber 15. From the rectifier 18 refrigerant vapor passes through pipe 19 into condenser 20 in which it is cooled and condensed. Liquid refrigerant from the condenser 20 passes into the U-tube 21 and then through pipe 22 and heat exchanger 23 into the evaporator 24 where it vaporizes and diffuses into an inert pressure equalizing gas such as hydrogen and absorbs heat from the surrounding medium.

The mixture of refrigerant vapor and inert gas passes through heat exchanger 23 and conduit 25 into the absorber where the refrigerant vapor is absorbed from the gas mixture by weak absorption liquid entering the absorber from the boiler through conduit 30, heat exchanger 31 and conduit 32. The inert gas rises in the absorber and returns to the evaporator through conduit 26 and heat exchanger 23. Heat is removed from the absorber by water flowing through jacket 27 and passing through conduit 28 to the condenser 20 from which it discharges to waste. Enriched absorption liquid from the absorber 35 passes to the pump chamber 13 and the cycle is repeated.

In the analyzer 10a absorption liquid vapor will be washed out of the rising refrigerant vapor by the descending enriched absorption liquid and the latter will be weakened to a concentration approaching that of the solution in the generator.

Difficulties encountered in the liquid circulation include trouble in adjusting the supply of vapor to the pump in such a manner as to make the pump independent of the input beyond a certain range. It is desirable to have the pumping increase with the input but it is undesirable to have the pumping decrease with the input as occurs beyond a certain high input due to the resistance offerred by the pump pipe. When the volume of gas passing through this pipe becomes too great the liquid must proceed at a very high velocity which increases the resistance and slows down the pumping. This can be overcome by providing a vapor by-pass connected to the pump chamber at a certain level through which vapor generated beyond a certain volume will not choke up the pumping but will pass directly to the rectifier.

As shown in Fig. 3 a by-pass 36 is connected at one end to the pump chamber 13 and the other end may be connected either to the separating chamber 15 or directly to the rectifier 18 in the system shown in Fig. 1. With this arrangement, as the input increases and the liquid level in the pump chamber 13 falls, an increasing area of the opening of the by-pass 36 is uncovered and due to the difference in area of the pump hole and the by-pass a greater proportion of vapor is permitted to escape directly to the rectifier.

In Fig. 2 of the drawings is shown an arrangement whereby only a portion of the vapor generated in the boiler is used for pumping, and both the pumping vapor and the vapor passing directly to the rectifier are brought into contact with the absorption liquid in an analyzer for the removal of absorption liquid vapor. The generator comprises a horizontal boiler 37 with a standpipe 38 which is constructed at its upper portion with baffle plates 39 forming an analyzer chamber 40. The boiler 37 contains a solution of refrigerant in an absorption liquid and is heated by some means such as flue 41. Extending into the lower part of the boiler standpipe 38 is a pipe 42 with its upper end extending into an analyzer 43. The bottom of the analyzer 43 is connected to the top of analyzer 40 through conduit 44 in which there is a trap 45. The upper part of analyzer 40 is connected to the pump chamber 13 through conduit 46 and the pump pipe 47 discharges into the upper end of analyzer 43. The other apparatus is connected to form the well known absorption refrigerating system of the equalized pressure type.

In operation, part of the refrigerant vapor expelled from solution in the boiler by heat passes upwardly through pipe 42 into analyzer 43. The remainder of the vapor from the boiler passes upwardly through analyzer 40 and into the pump chamber 13 through conduit 46. Enriched absorption liquid from the absorber 35 passes through conduit 29 and liquid heat exchanger 31 into the pump chamber 13 from where it is raised through the pump pipe 47 and discharged into the upper end of analyzer 43, where it flows downwardly in contact with and counterflow to the refrigerant vapor rising through this analyzer. From the bottom of analyzer 43 the absorption liquid flows through conduit 44 and trap 45 into the upper end of analyzer 40, where it flows downwardly over the baffle plates 39 in contact with and counterflow to the rising refrigerant vapor. With this arrangement absorption liquid vapor is removed from the refrigerant vapor in analyzer 43 and also from the pumping vapor in analyzer 40.

Refrigerant vapor from the upper part of analyzer 43 passes through conduit 17 to the rectifier 18 and condenser 20 to be liquefied and then vaporized in the evaporator 24 to produce a refrigerating effect in the usual manner.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. An absorption refrigerating system of the pressure equalized type including a generator containing a solution of refrigerant in an absorption liquid, means for heating said generator to expel refrigerant from the solution, an analyzer above said generator in open communication with the vapor space in said generator, an absorber, a vapor liquid pump supplied with enriched absorption liquid from the absorber and operated by refrigerant vapor from the analyzer, a separating chamber above said analyzer, a conduit for conducting liquid and vapor from said pump to said separating chamber, a by-pass connected from a point below the normal liquid level in the pump to the upper part of said separating chamber, and a conduit for liquid from said separating chamber to the upper portion of said analyzer.

2. In a refrigerating system of the class described, a generator, an absorber, a vapor liquid pump supplied with enriched absorption liquid from the absorber, a vapor connection from said generator to said pump, a separating chamber above said generator, a pump pipe extending from the pump to the separating chamber, a by-pass connection from a point below the normal liquid level in said pump to the separating chamber, and a conduit from the separating chamber to the generator.

3. An absorption refrigerating apparatus of the pressure equalized type including a generator, an analyzer above said boiler and in open communication with the vapor space in said generator, a second analyzer above the first said analyzer, a conduit having one end extending into said second analyzer and the other end extending below the liquid level in said boiler, a connection between the lower end of said second analyzer and the upper end of the first said analyzer, an absorber, and a vapor liquid pump arranged to discharge into the upper end of said second analyzer and supplied with enriched absorption liquid from said absorber and vapor from the first said analyzer.

4. An absorption refrigerating apparatus of the pressure equalized type including an analyzer boiler, an analyzer above said analyzer boiler, a conduit extending from below the liquid level in said analyzer boiler into the lower part of said analyzer, a connection between the bottom of said analyzer and the top of said analyzer boiler, a trap in said connection, an absorber, a vapor liquid pump between said absorber and the upper part of said analyzer, and a vapor connection between said pump and said analyzer boiler.

5. In a refrigerating system of the class described, heating the generator to expel refrigerant vapor from the solution therein, applying a portion of the refrigerant vapor thus expelled to raise strong liquor from the absorber to a level above the generator by the vapor liquid lift principle, separating the strong liquor from the refrigerant vapor, conducting the separated strong liquor by gravity to the generator in contact with and counterflow to the refrigerant vapor being expelled from solution in the generator, and conducting the remainder of the refrigerant vapor directly to the condenser in quantity dependent upon the rate of generation.

6. An absorption refrigerating system of the pressure equalized type including a generator, an analyzer above said generator and in open communication with the vapor space in the latter, an absorber located such that the normal liquid level therein is below the normal liquid level in the generator, a separating chamber above said analyzer, a vapor liquid lift connected between said absorber and said separating chamber, a conduit for supplying vapor from said analyzer to said liquid lift, and a conduit having a liquid trap from said separating chamber to said analyzer.

7. An absorption refrigerating system of the pressure equalized type including an analyzer boiler, an absorber located such that the normal liquid level therein is below the normal liquid level in the analyzer boiler, a separating chamber above said analyzer boiler, a vapor liquid lift discharging into said separating chamber and connected to receive liquid from said absorber and vapor from said analyzer boiler, and a conduit having a liquid trap from said separating chamber to the upper part of said analyzer boiler.

8. An absorption refrigerating system of the pressure equalized type including an analyzer boiler, an absorber located such that the normal liquid level therein is below the normal liquid level in the generator, a separating chamber above said analyzer boiler, a vessel connected to receive liquid from the absorber by gravity and vapor from said analyzer boiler, a thermosiphon conduit from said vessel to said separating chamber, and a conduit having a liquid trap from said separating chamber to the upper part of said analyzer boiler.

9. In a refrigerating system of the class described, utilizing a portion of the refrigerant vapor expelled from solution in the generator to raise enriched absorption liquid from the absorber to a level above the generator by the vapor liquid lift principle and conducting the remainder of the refrigerant vapor directly to the condenser-evaporator circuit in a quantity dependent upon the generator input.

10. An absorption refrigerating system of the pressure equalized type including an analyzer boiler having two analyzing chambers one above the other with separate communications to the liquid space, an absorber, a vapor liquid lift discharging into the upper of said analyzing chambers and connected to receive liquid by gravity from said absorber and vapor from the lower of said analyzing chambers, and a conduit having a liquid trap from the upper to the lower of said analyzing chambers.

11. An absorption refrigerating system of the pressure equalized type including an analyzer boiler, an absorber, a separating chamber above said analyzer boiler, a vessel connected to receive liquid from said absorber by gravity and vapor from said analyzer boiler, a thermosyphon conduit from said vessel to said separating chamber, a conduit having a liquid trap from said separating chamber to the upper part of said analyzer boiler, and a vapor by-pass conduit connected to said vessel so as to be opened upon a predetermined decrease in liquid level in the vessel.

12. An absorption refrigerating system of the pressure equalized type including a generator, an absorber, a vapor liquid lift supplied with refrigerant vapor from the generator for raising enriched absorption liquid from the absorber to a level above the generator, and means for by-passing refrigerant vapor in quantity dependent upon the generator input.

In testimony whereof I affix my signature.

DONALD B. KNIGHT.